United States Patent
Chen et al.

(10) Patent No.: US 12,318,717 B2
(45) Date of Patent: Jun. 3, 2025

(54) TUBELESS, MULTI-EFFECT DISTILLATION SYSTEM AND METHOD

(71) Applicant: KING ABDULLAH UNIVERSITY OF SCIENCE AND TECHNOLOGY, Thuwal (SA)

(72) Inventors: Qian Chen, Thuwal (SA); Raid Alrowais, Thuwal (SA); Muhammad Burhan, Lahore (PK); Muhammad Wakil Shahzad, Rahim Yar Khan (PK); Doskhan Ybyraiymkul, Almaty (KZ); Faheem Hassan Akhtar, Thuwal (SA); Kim Choon Ng, Singapore (SG)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 156 days.

(21) Appl. No.: 17/779,040

(22) PCT Filed: Nov. 18, 2020

(86) PCT No.: PCT/IB2020/060864
§ 371 (c)(1),
(2) Date: May 23, 2022

(87) PCT Pub. No.: WO2021/105822
PCT Pub. Date: Jun. 3, 2021

(65) Prior Publication Data
US 2022/0410029 A1    Dec. 29, 2022

Related U.S. Application Data

(60) Provisional application No. 62/940,212, filed on Nov. 25, 2019.

(51) Int. Cl.
*C02F 1/06*     (2023.01)
*B01D 1/16*    (2006.01)
(Continued)

(52) U.S. Cl.
CPC .............. *B01D 3/065* (2013.01); *B01D 1/16* (2013.01); *B01D 1/26* (2013.01); *B01D 61/3641* (2022.08);
(Continued)

(58) Field of Classification Search
CPC ............ B01D 1/16; B01D 1/26; B01D 3/065
See application file for complete search history.

(56) References Cited

U.S. PATENT DOCUMENTS 2,560,073 A * 7/1951 Bloomer .................. B04C 9/00
261/21
2,702,696 A * 2/1955 Pappas ..................... B01D 3/20
261/114.1
(Continued)

OTHER PUBLICATIONS

Q. Chen, Kum Ja. M, Y. Li, K.J. Chua, "Experimental and mathematical study of the spray flash evaporation phenomena", Applied Thermal Engineering, vol. 130, 2018, pp. 598-610, ISSN 1359-4311, https://doi.org/10.1016/j.applthermaleng.2017.11.018.*
(Continued)

*Primary Examiner* — Jonathan Luke Pilcher
(74) *Attorney, Agent, or Firm* — PATENT PORTFOLIO BUILDERS PLLC

(57) ABSTRACT

A direct-contact, spray-assisted, evaporation and condensation, DCSEC system includes a heating block configured to receive and heat up seawater; plural evaporation and condensation stages, wherein n is a natural number, each stage being configured to generate water vapors through flash evaporation; an evaporation only stage connected to a last stage of the plural evaporation and condensation stages, the evaporation only stage configured to receive a brine from the last stage n of the plural evaporation and condensation stages; an input/output block configured to receive the brine from the evaporation only stage and to discharge it outside the system, and also to receive cooling water; and a pres-
(Continued)

sure-swing regeneration block fluidly connected to the evaporation only stage to receive the water vapors and to generate a hot vapor, which is provided to the heating block for heating the seawater.

20 Claims, 13 Drawing Sheets

(51) Int. Cl.
  *B01D 1/26* (2006.01)
  *B01D 3/06* (2006.01)
  *B01D 61/36* (2006.01)
  *B01D 5/00* (2006.01)
(52) U.S. Cl.
  CPC .............. *C02F 1/06* (2013.01); *B01D 5/0027* (2013.01); *B01D 5/006* (2013.01)

(56) References Cited

U.S. PATENT DOCUMENTS

| | | | | |
|---|---|---|---|---|
| 2,908,618 | A * | 10/1959 | Bethon | B01D 3/065 202/180 |
| 3,288,686 | A * | 11/1966 | Othmer | C02F 1/04 203/88 |
| 3,583,895 | A * | 6/1971 | Othmer | B01D 1/26 159/2.3 |
| 3,653,186 | A * | 4/1972 | McLendon | B01D 3/18 96/365 |
| 4,018,656 | A * | 4/1977 | Rogers | C02F 1/06 203/80 |
| 4,379,734 | A | 4/1983 | Franzen | |
| 5,378,267 | A * | 1/1995 | Bros | B01D 19/0015 96/202 |
| 8,029,675 | B2 * | 10/2011 | Heinzl | B01D 63/10 202/160 |
| 8,617,359 | B2 * | 12/2013 | Lehmann | B01D 1/2887 203/25 |
| 9,120,033 | B2 * | 9/2015 | Govindan | C02F 1/06 |
| 10,143,936 | B2 * | 12/2018 | Govindan | B01D 3/343 |
| 10,150,681 | B2 * | 12/2018 | Yuh | F24S 23/77 |
| 10,464,825 | B2 * | 11/2019 | Yuh | H01L 31/0547 |
| 10,569,188 | B2 * | 2/2020 | Lehmann | C02F 1/12 |
| 10,596,521 | B2 * | 3/2020 | Khalifa | B01D 61/58 |
| 11,084,735 | B2 * | 8/2021 | Yuh | B01J 20/283 |
| 11,524,906 | B2 * | 12/2022 | Yuh | H01L 31/0547 |
| 11,753,313 | B2 * | 9/2023 | Perryman, Jr. | B01F 23/231 203/10 |
| 12,049,410 | B2 * | 7/2024 | Lee | C02F 1/28 |
| 2006/0157338 | A1 * | 7/2006 | Eddington | B01D 3/065 203/2 |
| 2008/0034785 | A1 * | 2/2008 | Yanagi | F25B 17/083 62/109 |
| 2011/0048920 | A1 * | 3/2011 | Avery | B01D 1/0011 62/238.3 |
| 2012/0119396 | A1 * | 5/2012 | Saha | C02F 1/04 261/148 |
| 2013/0175155 | A1 * | 7/2013 | Lee | B01D 1/24 202/185.1 |
| 2013/0341177 | A1 * | 12/2013 | Ng | C02F 1/043 203/41 |
| 2014/0290247 | A1 * | 10/2014 | Mishima | F03G 6/067 60/641.9 |
| 2017/0007942 | A1 * | 1/2017 | Hardiman | B01D 5/003 |
| 2017/0072336 | A1 * | 3/2017 | Ng | B01D 53/0462 |
| 2019/0054392 | A1 * | 2/2019 | Lehmann | B01D 3/065 |

OTHER PUBLICATIONS

Q. Chen, M. Kum Ja, Y. Li, K.J. Chua, "Energy, economic and environmental (3E) analysis and multi-objective optimization of a spray-assisted low-temperature desalination system", Energy, vol. 151, 2018, pp. 387-401, ISSN 0360-5442, https://doi.org/10.1016/j.energy.2018.03.051.*
Q. Chen, M. Kum Ja, Y. Li, K.J. Chua, "Energy, exergy and economic analysis of a hybrid spray-assisted low-temperature desalination/thermal vapor compression system," Energy, vol. 166, 2019, pp. 871-885, ISSN 0360-5442, https://doi.org/10.1016/j.energy.2018.10.154.*
Chen, Q., et al., "Development of a Model for Spray Evaporation Based on Droplet Analysis," Desalination, Aug. 20, 2016, vol. 399, pp. 69-77, Elsevier B.V.
Chen, Q., et al., "A Spray Assisted Low-Temperature Desalination Technology," Emerging Technologies for Sustainable Desalination Handbook. Butterworth-Heinemann, 2018, pp. 255-284, Elsevier Inc.
Chen, Q., et al., "On the Thermodynamic Analysis of a Novel Low-Grade Heat Driven Desalination System," Energy Conversion and Management, Sep. 28, 2016, vol. 128, pp. 145-159, Elsevier Ltd.
El-Fiqi, A.K., et al., "Flash Evaporation in a Superheated Water Liquid Jet," Desalination, Feb. 2007, vol. 206, Issues 1-3, pp. 311-321, Elsevier B.V.
First Examination Report in corresponding/related GCC Patent Application No. GC 2020-40949, dated Sep. 30, 2021.
Ikegami, Y., et al., "Experimental Study on a Spray Flash Desalination (Influence of the Direction of Injection)," Desalination, Jun. 2006, vol. 194, Issues 1-3, pp. 81-89, Elsevier B.V.
International Search Report in corresponding/related International Application No. PCT/IB2020/060864, date of mailing Mar. 5, 2021.
Miyatake, O., et al., "An Experimental Study of Spray Flash Evaporation," Desalination, Feb. 1981, vol. 36, Issue 2, pp. 113-128, Elsevier Scientific Publishing Company, Amsterdam.
Miyatake, O., et al., "Effect of Liquid Temperature on Spray Flash Evaporation," Desalination, Jun. 1981, vol. 37, Issue 3, pp. 351-366, Elsevier B.V.
Mutair, S., et al., "Experimental Investigation on the Characteristics of Flash Evaporation from Superheated Water Jets for Desalination," Desalination, Nov. 14, 2009, vol. 251, Issues 1-3, pp. 103-111, Elsevier B.V.
Mutair, S., et al., "Experimental Study on Flash Evaporation from Superheated Water Jets: Influencing Factors and Formulation of Correlation," International Journal of Heat and Mass Transfer, Jul. 31, 2009, vol. 52, Issues 23-24, pp. 5643-5651, Elsevier Ltd.
Muthunayagam, A.E., et al., "Modelling and Experiments on Vaporization of Saline Water at Low Temperatures and Reduced Pressures," Applied Thermal Engineering, Apr. 2005, vol. 25, Issues 5-6, pp. 941-952, Elsevier Ltd.
Wellmann, J., et al., "Exergoeconomic Evaluation of a CSP Plant in Combination with a Desalination Unit," Renewable Energy, Dec. 7, 2017, vol. 128, pp. 586-602, Elsevier Ltd.
Wellmann, J., et al., "Modeling an Innovative Low-Temperature Desalination System with Integrated Cogeneration In a Concentrating Solar Power Plant," Desalination and Water Treatment, Aug. 18, 2014, vol. 55, Issue 12, pp. 3163-3171, Balaban Desalination Publications.
Written Opinion of the International Searching Authority in corresponding/related International Application No. PCT/IB2020/060864, date of mailing Mar. 5, 2021.

* cited by examiner

|  | MSF[1] | MED[2] | SWRO[3] |
|---|---|---|---|
| Thermal | 0.310 | 0.310 | 0.000 |
| Parts | 0.010 | 0.010 | 0.030 |
| Chemicals | 0.050 | 0.080 | 0.070 |
| Labour | 0.080 | 0.080 | 0.100 |
| Membranes | 0.000 | 0.000 | 0.030 |
| Electrical | 0.600 | 0.420 | 0.720 |
| Capital cost | 0.420 | 0.350 | 0.290 |

FIG. 1

TUBELESS, MULTI-EFFECT DISTILLATION SYSTEM AND METHOD

CROSS-REFERENCE TO RELATED APPLICATIONS

This application is a U.S. National Stage Application of International Application No. PCT/IB2020/060864, filed on Nov. 18, 2020, which claims priority to U.S. Provisional Patent Application No. 62/940,212, filed on Nov. 25, 2019, entitled "DEVICES EMPLOYING TUBELESS EVAPORATION AND CONDENSATION CHAMBERS FOR WATER TREATMENT," the disclosures of which are incorporated herein by reference in its their entirety.

BACKGROUND

Technical Field

Embodiments of the subject matter disclosed herein generally relate to a system and method for water distillation, and more particularly, to an enhanced tubeless, multi-effect distillation system that uses direct contact spray evaporation and condensation, integrated with a pressure-swing adsorption cycle for water distilation.

Discussion of the Background

In the harsh hot and arid climate, the Gulf Co-operation Council (GCC) countries suffer from an acute scarcity in potable water availability. The daily average water availability per capita in these countries has fallen drastically, below the UN defined acute water stress (AWS) level of 250 $m^3$. Such a water shortage scenario in GCC is attributed to the dry arid and desert climate, and this dire situation is further compounded by man-made factors, namely the exponential increase in population and the quest for rapid economic growth. Confronted by these challenges, the seawater desalination industry could provide, over the short and near term, the most viable and sustainable solution for solving the demand-supply water gap of the region.

There are two major types of seawater desalination systems, namely, (1) the thermally-driven systems, such as the multi-stage flashing (MSF), the multi-effect distillation (MED), etc., and (2) the work-driven membrane-based desalination system, commonly known as seawater reverse osmosis (SWRO). Due to the severe seawater feed conditions such as the high salinity, silt content (perturbility), and the frequent harmful algae blooms (HABs), an appropriate desalination method must be found to overcome these conditions. In 2008 and 2013, for example, the southern Gulf seawater was hit by severe HABS for a period up to 6 weeks, and during this period, most of the SWRO plants in Oman and Sharjah (UAE) were forced to stop operating due to the presence of the highly toxic algae species such as the Cyanobacteria and Saxitoxins, which are 500 times more toxic than Cyanide. As the size of algae species is of a similar order of magnitude as the pores of the SWRO membranes, the likelihood of toxic algae species polluting the permeate water is high. On the other hand, the evaporative process of the heat-driven methods generates water vapor molecules at 2.75 Angstroms diameters. Hence, the 2-10 μm-sized molecules of the algae would remain in the solution and can be gravimetrically filtered. For these reasons, the operation of the thermally-driven plants was unaffected throughout the HABs events and no health hazards were reported.

Another aspect of the seawater desalination plants that needs to be considered is the unit cost of the desalinated water. It comprises both the initial capital or CAPEX (usually defined by $/m^3$ of daily water production) and the annual operation (include electricity or steam, pre- and post-treatment, etc.) costs or OPEX. The table shown in FIG. 1 illustrates the unit cost of water for the above-mentioned desalination processes, as reported by Global Water Intelligence reports. Two salient points can be observed from the table: firstly, the SWRO method has slightly lower capital cost than the thermally-driven methods, but the operating cost of the latter is much lower as compared to the SWRO process due to the higher contribution of the used electricity. Currently, all existing desalination methods have their CAPEX greater than $1,000/$m^3$ day of designed capacity, and this is attributed to the costly internal components such as the membranes or the tube heat exchangers within the enclosures. Thus, one problem that plaques the existing desalination plants is the high CAPEC and OPEX.

The direct-contact, spray-assisted evaporation and condensation (DCSEC) methodology has the potential to mitigate the operational issues faced by the existing desalination systems [1]. This technology is schematically illustrated in FIG. 2. Both the evaporator 210 and the condenser 220 of a single stage 200 are hollow chambers without any metallic tubes inside. Being tubeless, the externally heated seawater 212 (typically up to 70° C. at the top-brine stage) is directly sprayed inside the evaporator 210, through nozzles 211. The part of the seawater that does not evaporate, exits the evaporator 210 as brine 214, while the vapor part 216 migrates to the condenser 220, through a channel 218. Cooling water 222 is sprayed inside the condenser 220, to condense the vapors 216. The condensed water, i.e., the permeate 224, is then extracted from the bottom of the condenser.

The DCSEC approach illustrated in FIG. 2 has two distinct advantages: Firstly, the initial design cost of the evaporator and condenser vessels are greatly reduced due to their tubeless nature, typically in terms of unit cubic meter of distillate per day, its CAPEX can be less than US$700/$m^3$/day. Secondly, the spray of the seawater 212 into an empty chamber 210 can mitigate the scale formation as there are virtually no dry spots within the chamber. Consequently, the direct depressurization of the liquid 212 at the nozzles 211, which spray the seawater 212 into the evaporator 210, result in the formation of liquid droplets 213, having sizes in the mm range. The corresponding excess water enthalpy held by the droplets 213, as they emerged from the nozzles 211 would result in the "vapor flashing" phenomenon, i.e., water vapor evaporates from the surfaces of the liquid droplets, reducing its diameter as the droplets travel down the trajectory paths 215. The generated vapor 216 in the evaporator 210 then migrates across to the adjacent condenser chamber 220, where permeate is generated.

Several studies were reported on the DCSEC system 200. For example, [2, 3] conducted experiments on spray flash evaporation within a superheated water jet pumped through a simple nozzle into a low-pressure chamber, where the feed temperatures were varied from 40° C. to 80° C. From those experiments, empirical equations were developed for the prediction of distillate production. [4] evaluated the flash evaporation performance by both numerical and experimental methods on saline water at low feed temperatures, between 26 to 32 K at vacuum pressures less than 2.40 kPa. This study reported good agreement between predictions and experiments. [5] compared experiments between opposite directions of injection, i.e., upward and downward jets on the performance of spray flash desalination, at assorted liquid superheat (24 K to 40 K) and feed temperatures from a low-pressure vapor zone. The report observed that the flash evaporation process performed better and yet with a shorter distance in an upward direction. [6, 7] conducted similar studies of flash evaporation using upward jets but with larger nozzles. The report found that the intensity of the flash evaporation increased with higher initial water temperatures and the degree superheat. [8] presented a flashing process using tap water, at assorted flow rates with the feed temperatures ranging from 40° C. to 70° C., and the injection pressure up to 6 bar and the degree of superheat ranging from 6 to 18 K. The report concluded that the chamber length is inversely proportional to the water vapor production and flashing efficiency. Recently, [9] also simulated the droplet evaporation processes in a single-stage configuration and the report observed the relationship between increasing water productivity with initial droplet velocity. The report highlighted that smaller droplets of feed are important parameters for enhancing the evaporation processes. In a subsequent paper, [10] conducted a simulation study on multi-stages direct contact spray evaporation and condensation system. The water production and thermal efficiency for multi-stages were observed to show significant improvement as compared with a single-stage system. This system has an improved performance ratio, defined as the ratio of the equivalent heat of distillate to heat input, of 6.5 for a 14-stage desalination plant. [11, 12] simulated a multi-stage, low-temperature desalination system powered with 10 $MW_{thermal}$ thermal CSP (concentrated solar power) plant and 7 $MW_{electric}$ diesel engines. The cogeneration plant was predicted to produce 520 $m^3$ per day of freshwater.

It is observed from the above literature review that the parameters that govern the DCSEC process of seawater desalination and can make a real impact on the efficiency and cost of a corresponding plant are (i) the temperature difference between the temperature of the feed water and the evaporative chamber, (ii) the feed of seawater to the evaporator and the freshwater to the condenser, and (iii) the size of the water droplets for flashing processes. However, all flashing rates reported in the literature were relatively low with respect to the feed flow rate.

In addition, one major limitation for the existing systems is the obstinate presence of high thermal non-equilibrium (NEDT) that exists between the superheated liquid or feed and the chambers' saturation temperatures ($T_f$-$T_{sat}$). The NEDT of a conventional superheat-driven flashing process is typically of the order 8-15K, as reported in the literature, and these NEDT are 2 to 3 times that of the conventional film evaporation of packed tubes. As a result, the evaporation rate and recovery ratio (ratio of distillate to seawater flowrate) are low. Another key limitation of the existing DCSEC process based plants is the relatively low productivity and energy efficiency due to losses related to the condensation heat.

Thus, there is a need for a new DCSEC system that is capable of overcoming the above noted deficiencies, is inexpensive to be implemented and maintained, and also is not being affected if algae is present in the seawater.

BRIEF SUMMARY OF THE INVENTION

According to an embodiment, there is a direct-contact, spray-assisted, evaporation and condensation, DCSEC system that includes a heating block configured to receive and heat up seawater, plural evaporation and condensation stages, where n is a natural number, each stage being configured to generate water vapors through flash evaporation, an evaporation only stage connected to a last stage of the plural evaporation and condensation stages, the evaporation only stage configured to receive a brine from the last stage n of the plural evaporation and condensation stages, an input/output block configured to receive the brine from the evaporation only stage and to discharge it outside the system, and also to receive cooling water, and a pressure-swing regeneration block fluidly connected to the evaporation only stage to receive the water vapors and to generate a hot vapor, which is provided to the heating block for heating the seawater.

According to another embodiment, there is a direct-contact, spray-assisted, evaporation and condensation, DCSEC, system that includes plural evaporation and condensation stages, wherein n is a natural number, each stage being configured to generate vapors through flash evaporation, from seawater, and a pressure-swing regeneration block configured to receive the water vapor and to generate a hot vapor, which is used for heating the seawater. A stage j, with j<n, receives the seawater from a stage j−1, and the seawater is mixed with the vapor from a stage j+1, and the stage j provides a permeate to the stage j−1.

According to still another embodiment, there is a method for water desalination with a direct-contact, spray-assisted, evaporation and condensation, DCSEC, system. The method includes supplying seawater at plural evaporation and condensation stages, where n is a natural number and wherein the stages are tubeless, mixing the seawater from a stage j−1 with vapor from a stage j+1, where j<n, directly spraying the seawater and the vapor into a stage j, generating the vapors through flash evaporation in the stage j, supplying a permeate from the stage j to the stage j−1, and discarding the permeate outside the system after transferring heat from the permeate to the seawater.

BRIEF DESCRIPTION OF THE DRAWINGS

For a more complete understanding of the present invention, reference is now made to the following descriptions taken in conjunction with the accompanying drawings, in which:

FIG. 1 illustrates the cost associated with desalination plants that utilize various technologies;

DETAILED DESCRIPTION OF THE INVENTION

Figure 2:
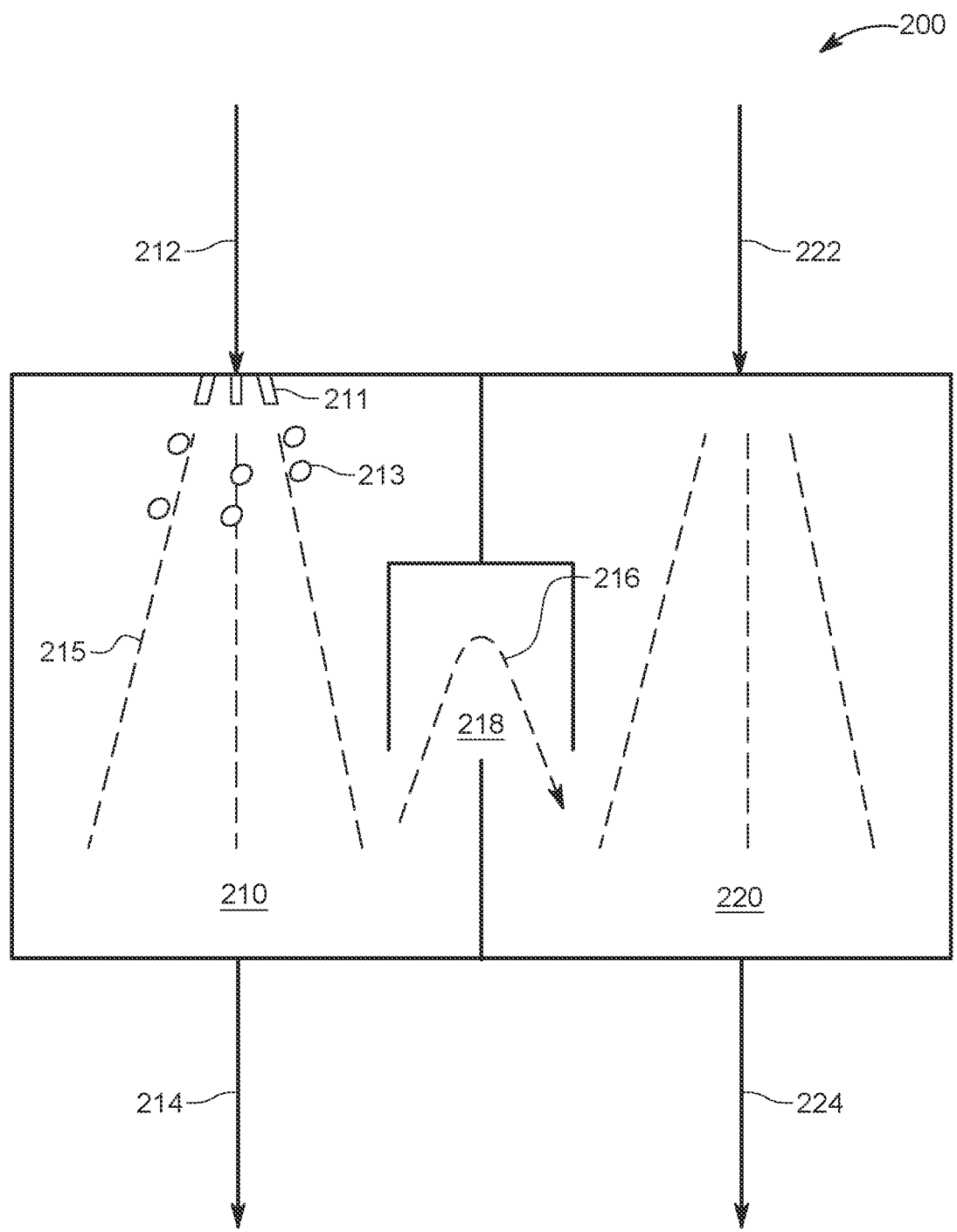
FIG. 2 illustrates a single stage of a direct-contact, spray-assisted evaporation and condensation process.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a desalination system that generates a permeate from seawater. However, the embodiments to be discussed next are not limited to such system, but may be applied to other type of systems or systems that use a different feed than the seawater.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is a DCSEC system that is configured to consume lower top-brine temperatures for the seawater feed as well as minimum chemical use for brine treatment. Such system was tested both as a single-stage and as a multi-stage configuration with seawater (3.5% by weight salinity) from the Red Sea. The performance of the system was investigated for a feed flow rate of 6 L/minute when the evaporator chamber temperature was varied from 38° C. to 60° C. From the experiments, maximum distillate production of 31 L/hr·m³ was recorded at 60° C. feed temperature for a single-stage configuration. To further enhance the distillate production of DCSEC, an innovative micro/nano-bubbles (M/NBs) generator device, called herein "vortex generator" is incorporated in the feed supply system, which resulted in 34% increase in potable water production at the corresponding inlet feed temperatures. The "vortex generator" injects water vapor microbubbles ($T_{vapor}$ lower than $T_{liquid}$) into the seawater feed, increasing both the nucleation sites and surface area that are needed for enhancing liquid flashing process. These embedded nucleation sites can lower the NEDT to 2.5-4 K, which is of similar order in NEDT achieved by the tube-based processes. In this or another embodiment, it is possible to introduce hollow-fiber membrane modules at the bottom of the evaporators, which allow the brine to further evaporate. The hollow-fiber membrane modules employ hydrophobic membranes. The outer side of the modules is exposed to seawater, while the inner side is connected to the condenser. Water molecules will pass the membrane pores to the condenser due to the pressure difference between the inner and outer sides of the module.

Further, this or another embodiment may further reduce the energy consumption by using the brine from each evaporator as the feed for a next evaporator, and the cooling water from each stage is injected into a previous condenser. Additionally, this or another embodiment uses a pressure-swing regeneration process that not only eliminates the need of a separate condenser for the last stage, but also allows the reuse of the regenerated fluid as part of the heat source, which further reduces the heat input requirement. This embodiment and its possible variations are now discussed with regard to the figures.

Figure 3:
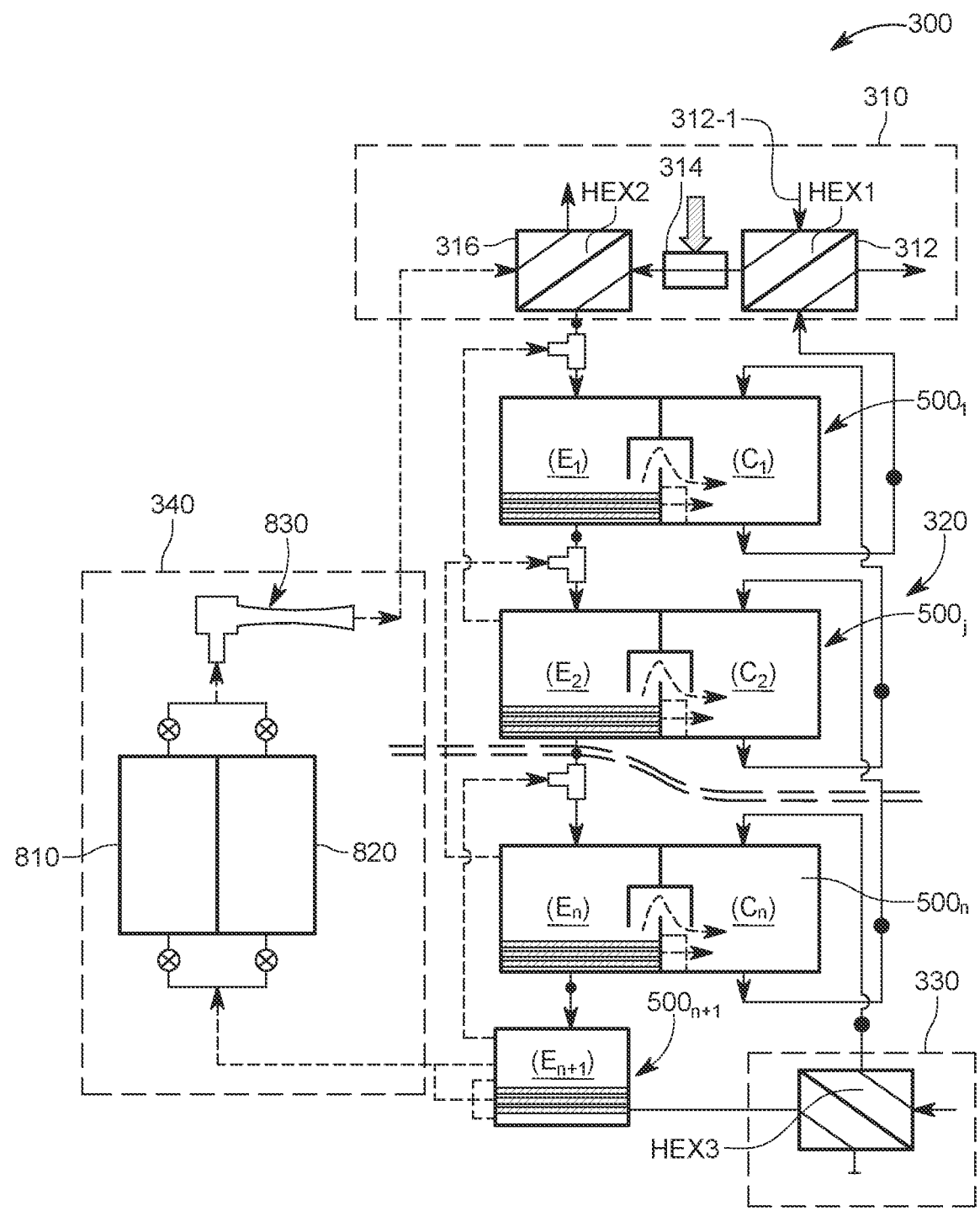
FIG. 3 illustrates a multi-stage, direct-contact, spray-assisted evaporation and condensation system that is tubeless and uses a pressure-swing regeneration block and a vortex generator.

FIG. 3 shows a DCSEC system 300 (also called desalination system) that achieves one or more of the advantages discussed above. The system 300 includes an external heating block 310 that receives the seawater and heats it up, a multistage desalination block 320 having n stages, which extracts the permeate from the seawater and generates the brine, an input/output block 330 that receives cooling water and outputs the brine, and a pressure-swing regeneration block 340 that reduces the input energy needed for the desalination process. The system 300 is now discussed in more detail.

Figure 4:
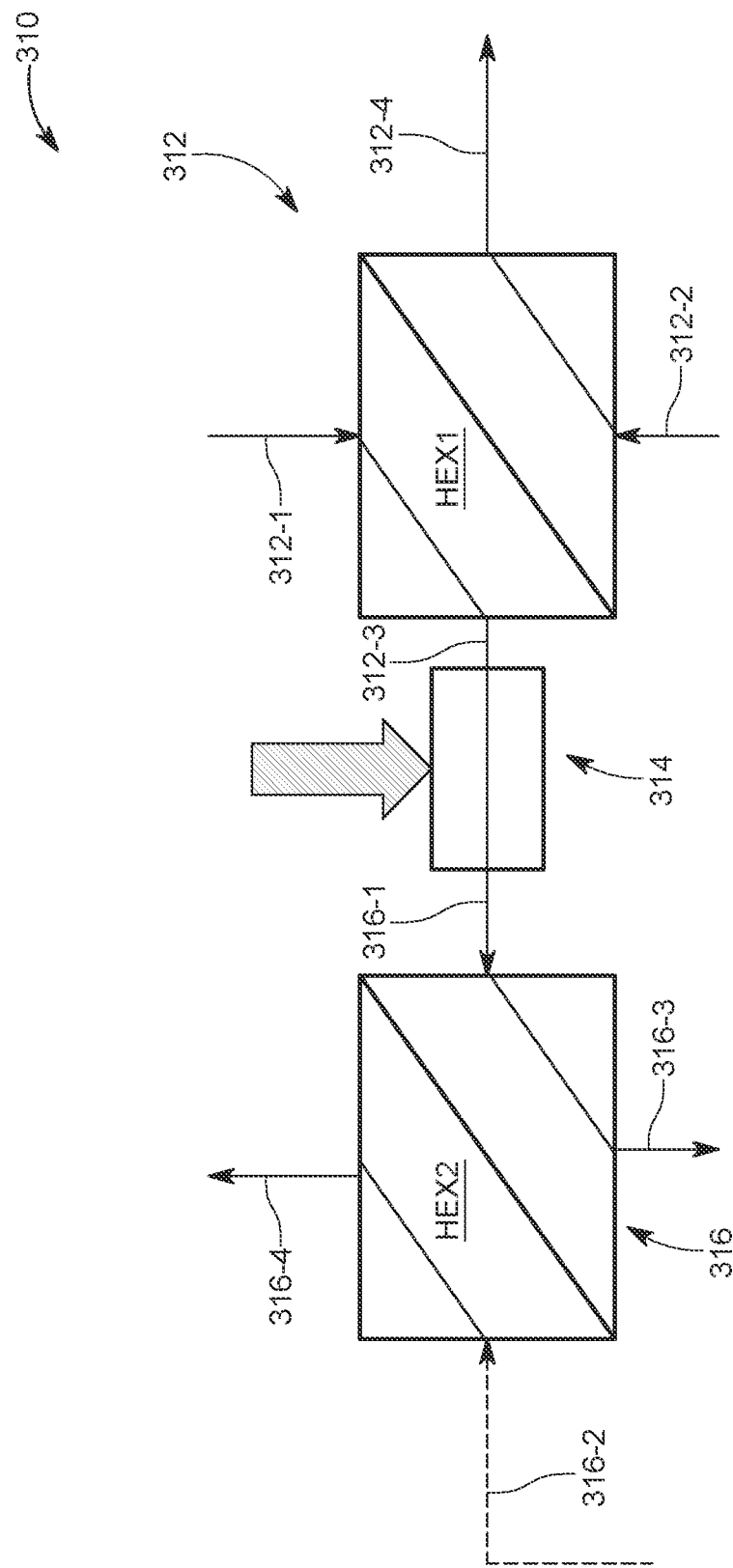
FIG. 4 illustrates an external heating block of the multi-stage, direct-contact, spray-assisted evaporation and condensation system.

The external heating block 310, which is shown in more detail on FIG. 4, includes a first heat exchanger 312, an optional heating source 314, and a second heat exchanger 316, which are fluidly coupled to each other in this order. The first heat exchanger 312 has a first input 312-1, which is configured to receive the seawater. The first heat exchanger 312 has also a second input 312-2 that is configured to receive the permeate from the first stage of the multistage desalination block 320. The first heat exchanger 312 transfers heat from the permeate to the seawater so that a temperature of the seawater is increased, for example, from 30° C. to 60° C. For this example, the incoming seawater is at 30° C. while the permeate leaving the first stage of the multistage desalination block 320 is at 65° C. However, other temperatures may be used. The first heat exchanger 312 also has a first output 312-3, that provides the heated seawater to the heating source 314, and a second output 312-4 that outputs the cooled distillate and the cooling water from the system 300.

The heating source 314 is optional, and its purpose is to further increase the temperature of the seawater. The heating source may be a solar thermal collector, steam from an existing plant, etc. The second heat exchanger 316 has a first input 316-1, for receiving the heated seawater, and a second input 316-2, for receiving thermal vapor from the pressure-swing regeneration block 340. This vapor is discussed later. It is noted that the vapor can be received from any other source. In one embodiment, there is no need for a vapor for further increasing the temperature of the heated seawater, in which case the entire second heat exchanger 316 is not needed. The second heat exchanger 316, if present, also has a first output 316-3 that provides the heated seawater (now at about 75° C.) to the multistage desalination block 320. The second heat exchanger 316 further has a second output 316-4 that provides a condensate outside the system.

Figure 5:
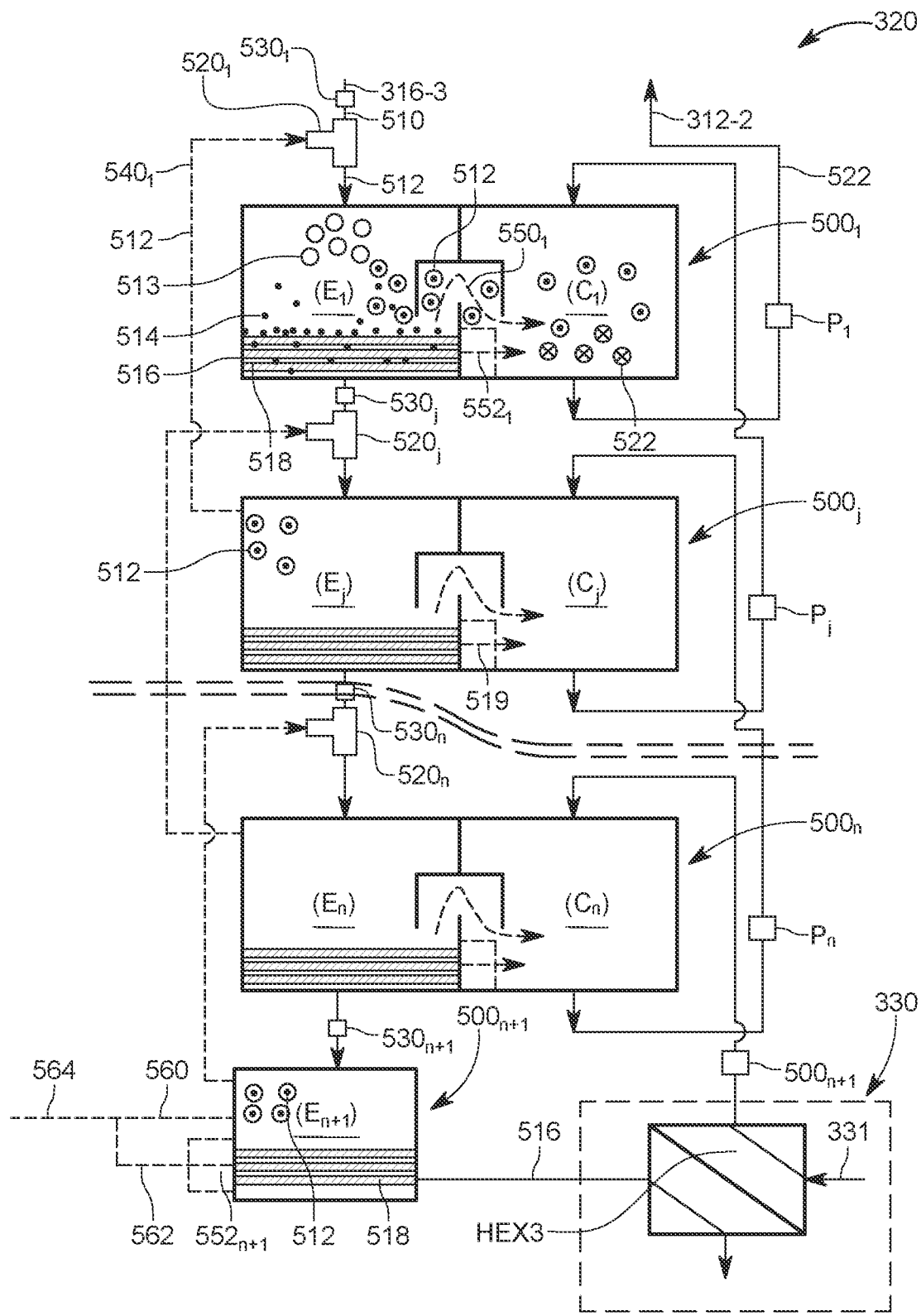
FIG. 5 shows the plural stages and their connections of the multi-stage, direct-contact, spray-assisted evaporation and condensation system.

The multistage desalination block 320 is shown in more detail in FIG. 5 and includes "n" identical evaporation and condensation stages $500_n$, where n is a natural number, and a final evaporation only stage $500_{n+1}$, which is different from the other stages. For a practical implementation of this system, n can vary between 2 and 10. However, any other number of stages may be used. Each stage $500_{n+1}$, where j is a natural number smaller than or equal to n, includes an evaporator chamber Ej and a condenser chamber Cj, with no tubes extending into any of these chambers, i.e., the evaporator and condenser are tubeless. This means that the seawater 510 that is pumped with a seawater pump $530_1$ at stage j=1, into the vortex generator $520_1$, is mixed with water vapor 512, received along a conduit $540_1$, from the next stage $520_2$, and micro or nano-bubbles 513 (called bubbles herein) are formed, which are injected into the evaporator $E_1$. Note that conduit $540_1$ fluidly connects one evaporator to an adjacent evaporator for the transport of the vapor 512. Water vapors 512 are evaporating from the bubbles 513, and the remaining concentrated seawater 514 falls to the bottom of the evaporator $E_1$, where it forms a pool of brine 516. A membrane module 518 is placed inside the brine pool 516 for further separating water vapor from the brine. The water vapor 512 moves due to the temperature difference between the evaporator $E_1$ and the condenser $C_1$ along the path $550_1$, which is a conduit having metallic or plastic walls that fluidly communicates the evaporator and the condenser.

Figure 6A:
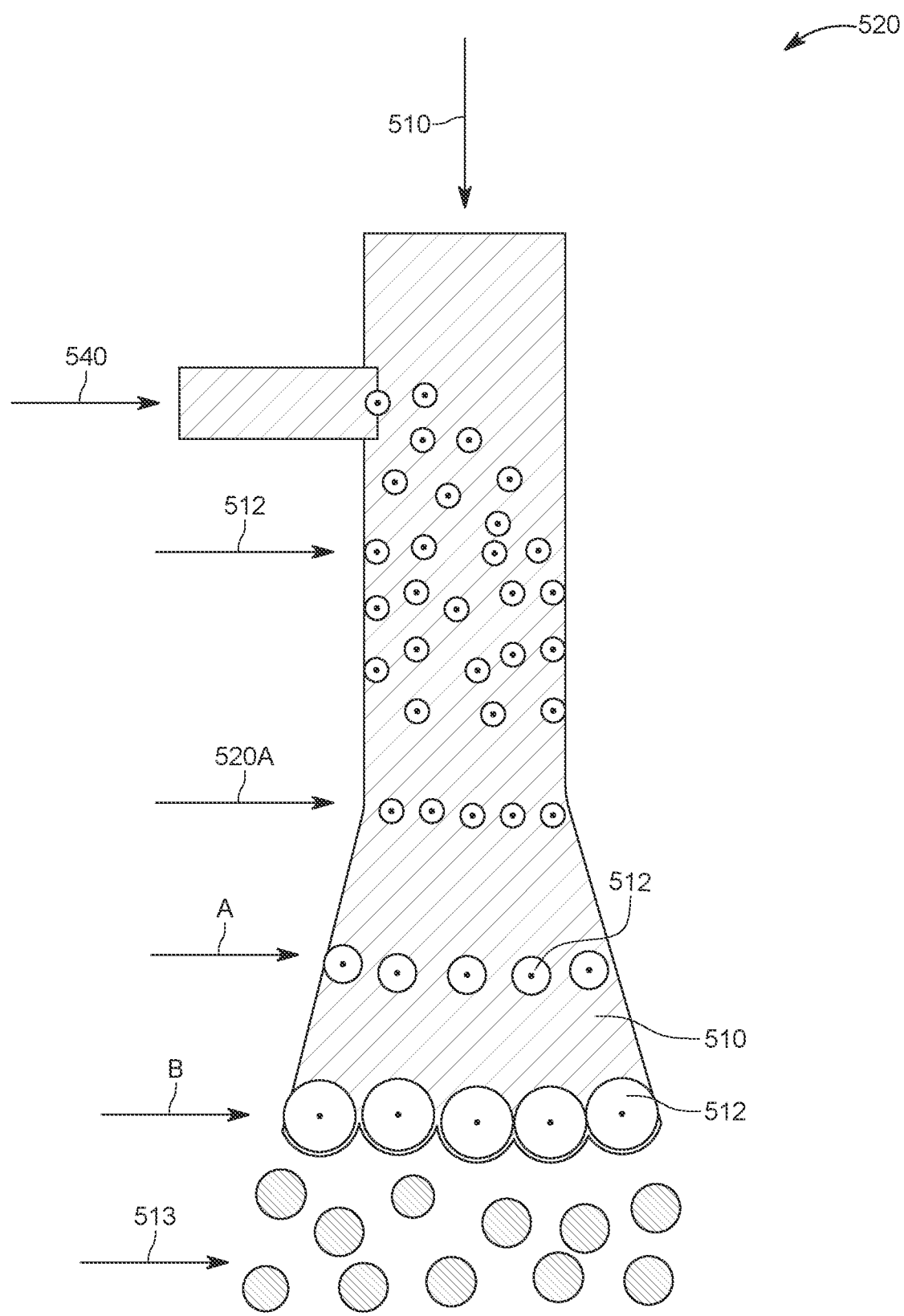
FIG. 6A shows an operation principle of the vortex generator and FIG. 6B shows a specific implementation of the vortex generator.
Figure 6B:
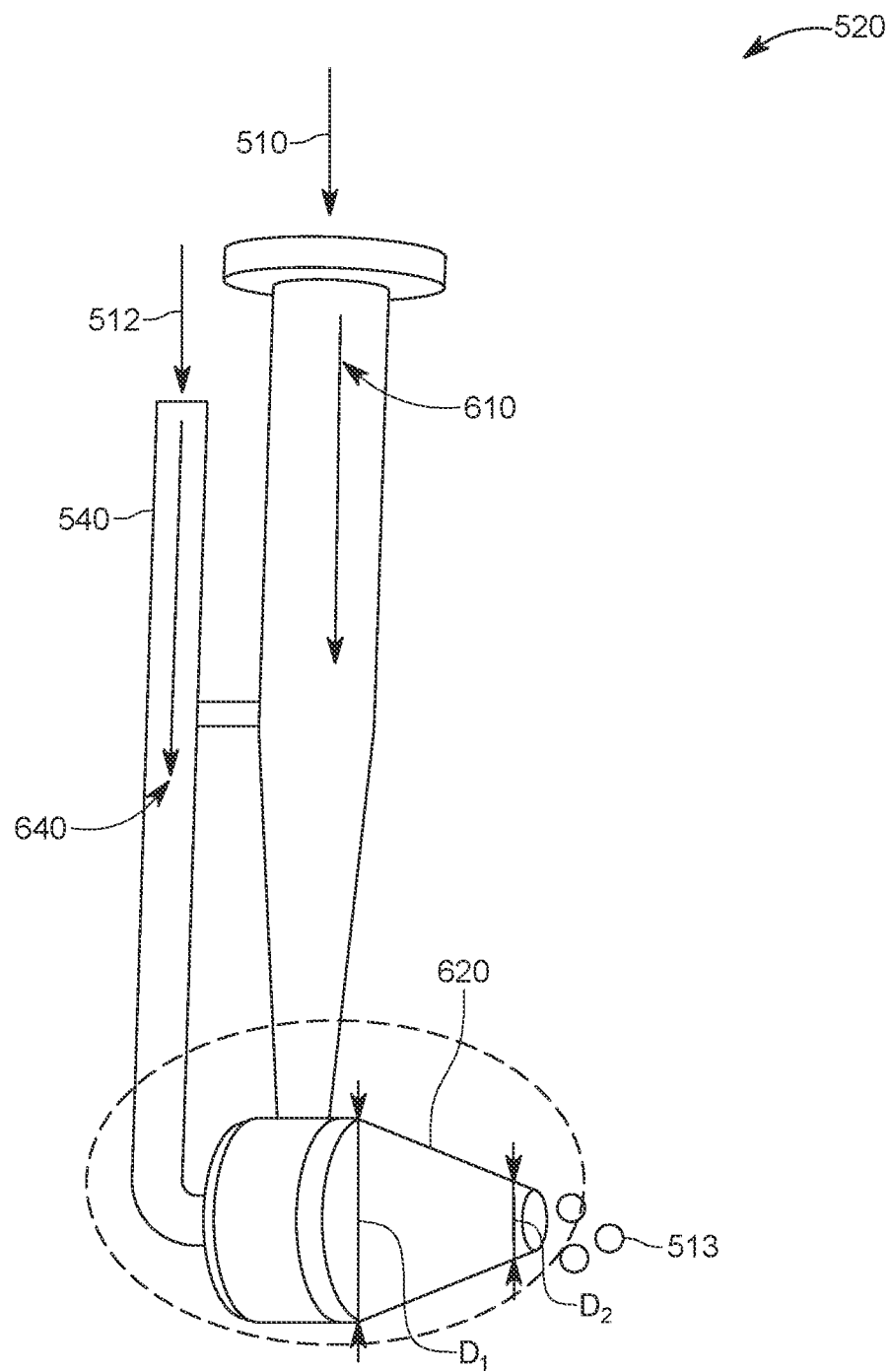

The vortex generator $520_1$, which is schematically shown in FIG. 6A and implemented in a specific configuration in FIG. 6B, injects the water vapor bubbles 512 having a temperature $T_{vapor}$ lower than the temperature $T_{liquid}$ of the seawater 510, into the seawater feed 510, increasing both the nucleation sites and the surface area that are needed for enhancing the liquid flashing process. FIG. 6A shows the water vapor bubbles 512 increasing in size at point A, until they touch each other, at point B, after exiting the tip 520A of the vortex generator 520. At this point, the water vapor 512 shatter the seawater 510, forming small liquid drops or bubbles 513, that promote further vapor 512 formation by flash evaporation within the evaporator $E_1$, and the rest of the bubble becomes the concentrated seawater 514, which accumulates as brine 516 at the bottom of the evaporator. These embedded nucleation sites 512 can lower the NEDT to 2.5-4 K, which is of similar order in NEDT achieved by the tube-based processes.

FIG. 6B shows one possible actual implementation of the vortex generator 520, having a liquid inlet 610 and a vapor inlet 640, both of which are fluidly communicating with a body 620. The vapor inlet 640 is connected to the conduit 540 illustrated in FIG. 3. The vapor 512 is distributed symmetrically inside the body 620 while the fluid 510 is injected asymmetrically inside the body, for example, at a side of the body, to form a jet motion of the liquid, which when mixed with the injected vapor, forms the bubbles 513. A size of the bubbles 513 may be in the nanometer or micrometer range. For example, the sizes of the bubbles 513 may be 60 to 150 μm. Other sizes may be generated. Because the body 620 has a conical shape, with an initial diameter D1 larger than the nozzle diameter D2, the liquid 510 is accelerated, enhancing the bubble generation effect. In one application, the liquid 510 is injected inside the body 620 tangential to a wall of the body, to further increase its speed inside the body. The greater the speed of the injected fluid, the smaller the sizes of the bubbles 513.

Figure 7:
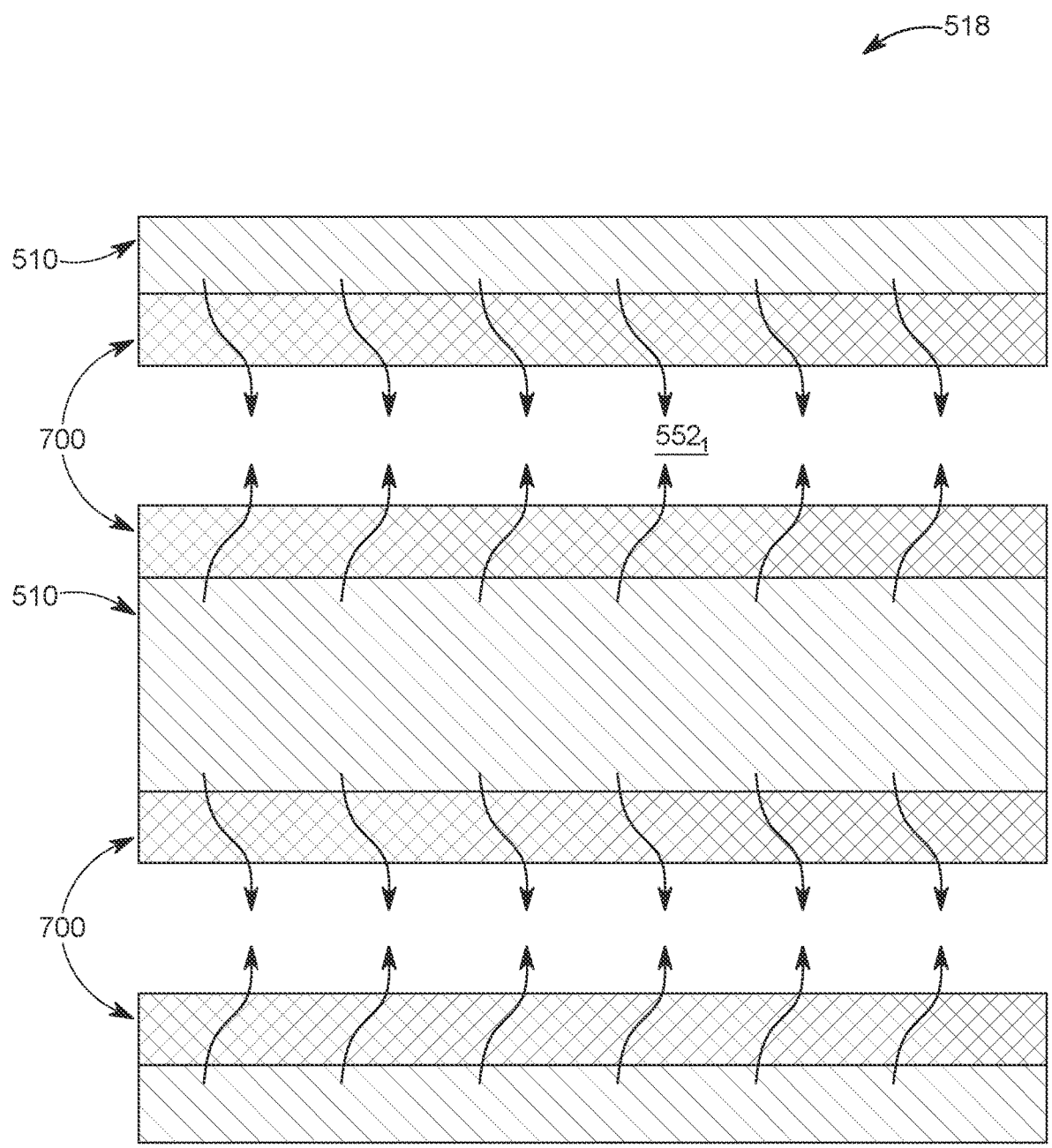
FIG. 7 illustrates a membrane module that is placed in the stages of the multi-stage, direct-contact, spray-assisted evaporation and condensation system.

The membrane module 518 is shown in FIG. 7 and may include plural membranes 700, each one being a hollow-fiber membrane. The membrane module 518 is placed at the bottom of the evaporator, within the brine 516, which allows further water vapor to pass the filter and form permeate inside the membrane. The hollow-fiber membrane modules employ hydrophobic membranes. The outer side of the membrane 700 is exposed to the seawater 510, while the inner side, which receives the vapor $552_1$, is connected through a conduit 519 (see FIGS. 5) to the inside of the corresponding condenser $C_1$. Water molecules that form the permeate $552_1$ will pass the pores of the membrane due to the pressure difference between the inner and outer sides of the module, and then the permeate is collected to the condenser $C_1$. Thus, the condenser $C_1$ is configured to receive not only the water vapor 512 formed inside the evaporator $E_1$, but also the water vapor $552_1$ arriving in the membrane module 518.

After the water vapor 512 and $552_1$ arrives in the condenser $C_1$, it condenses to form the permeate 522, which is pumped with a corresponding permeate pump P1 to a previous stage (see FIG. 5), or, if the first stage is considered, to the input 312-2 of the first heat exchanger 312 shown in FIGS. 3 and 4. This means, as shown in FIG. 5, that each stage j has its own pump $P_j$ that pumps the permeate to the previous stage j−1 for condensing the vapor 512 to form the permeate 522. However, as the permeate from each stage j moves from stage to the next one, the final permeate 522 that is pumped by the permeate pump P1 to the input 312-2 of the first heat exchanger 312 becomes hotter (about 65° C.), and that heat is transferred to the incoming seawater 510 to raise its temperature to about 60° C., as previously discussed.

While FIG. 5 shows the plural stages $500_j$ as being located in top of each other, along a vertical direction, one skilled in the art would also understand that these stages can be located in a single given horizontal plane. The same is true for the heat exchangers and the other elements shown in the figures.

Figure 8:
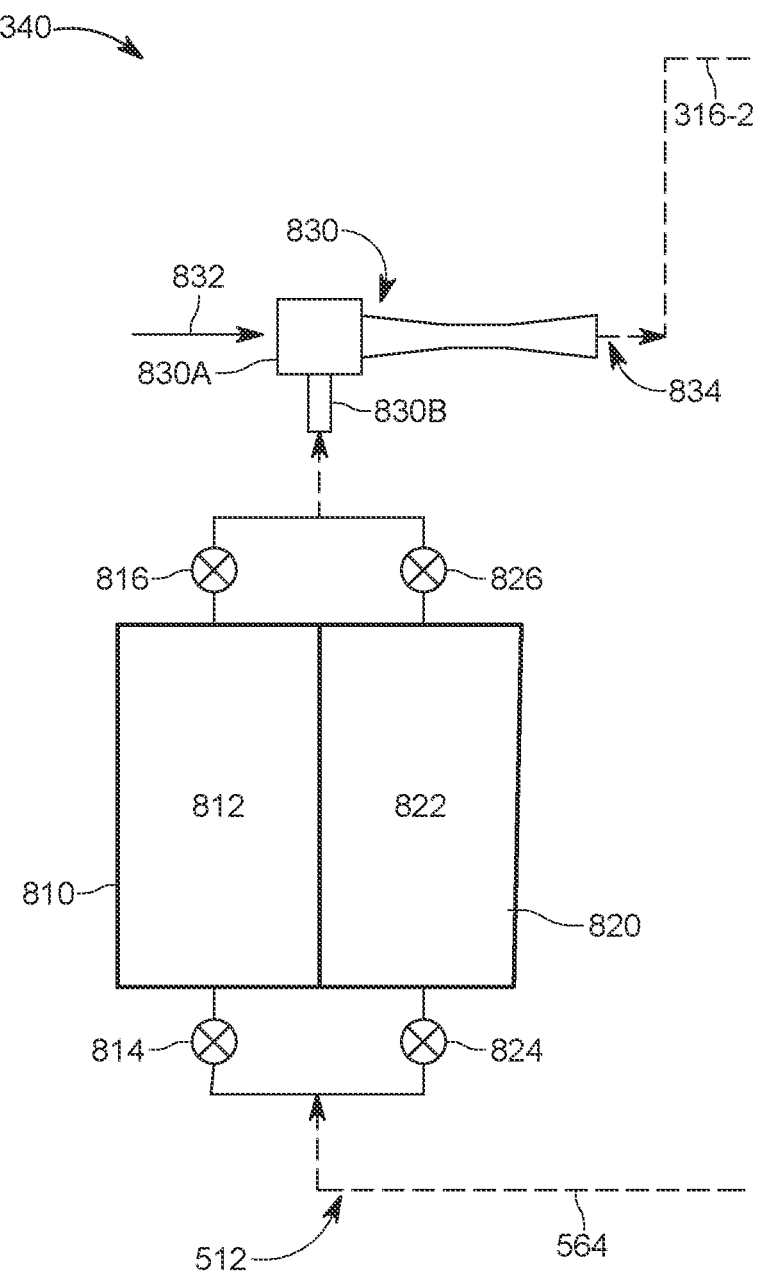
FIG. 8 illustrates the pressure-swing regeneration block of the multi-stage, direct-contact, spray-assisted evaporation and condensation system.

It is noted that the last stage $500_{n+1}$ has no condenser, but only an evaporator $E_{n+1}$. The purpose of this design is to drive a part of the vapors 512 from above the membrane module 518, and also the vapors $552_{n+1}$ from inside the membrane module 518, along respective paths 560 and 562, to a single conduit 564, which constitutes the input of the pressure-swing regeneration block 340, and another part of the vapors 512 to the vortex generator from the previous stage. The pressure-swing regeneration block 340 (or regeneration block) is shown in FIG. 8 as taking the vapor 512 as input, and generating a hot vapor 834 at its output. More specifically, the regeneration block 340 includes a first tank 810 including an adsorption bed 812 (e.g., silica but other adsorbent materials may be used) that is configured to adsorb water from the input vapor 512, and also includes a second tank 820, which includes a corresponding adsorption bed 822, which is also configured to absorb water. The two tanks 810 and 820 are fluidly connected to the conduit 564, through corresponding inlet valves 814 and 824. The two tanks are also fluidly connected to a thermal vapor compressor (TVC) 830 through corresponding output valves 816 and 826. The TVC 830 receives, at a first input 830A, steam 832 at a high pressure (2-3 bar) from a boiler or any other source, and increases the temperature of this stem to generate the hot steam 834. During this process, the TVC also extracts the water from one of the adsorbent beds 812 or 822, depending on which outlet valve 816 or 826 is open.

In this regard, when the regeneration block 340 has the inlet valve 814 open, the inlet valve 824 is closed, so that the vapor from the last stage $500_{n+1}$ enters only the first tank 810. At the same time, the output valve 816 is closed and the output valve 826 is open so that the low pressure created by the TVC 830 at its second input 830B extracts the water vapor only from the adsorption bed 822.

Because evaporation heat is supplied by the sensible heat of the seawater, the water temperature at the last evaporator $E_{n+1}$ will be below the ambient temperature (10-15° C.). The cold brine 516 is employed to cool down the cooling water 331 at the input/output block 330. A lower cooling water temperature provides a larger driving force for evaporation and allows for additional numbers of operating stages.

Therefore, both fresh water yield and energy efficiency will be marked improved. After the porous material in the adsorption bed 812 or 822 is saturated with water molecules, it has to be regenerated. The pressure-swing regeneration process is implemented by thermal vapor compression, as discussed with regard to FIG. 8. High-pressure steam 832 is supplied to the thermal vapor compressor 830 to create a low-pressure environment at input 830B and force water molecules to be detached from the adsorption material 812/822. The mixture of the high-pressure steam 832 and regenerated vapor 834 has a moderate temperature (55-75° C.) and it is employed for heating the seawater 510 in the second heat exchanger 316. The pressure-swing regeneration process not only eliminates the need of a separate condenser for the last stage, but also allows the reuse of the regenerated vapor as part of the heat source, which further reduces the heat input requirement of the system 300.

Figure 9:
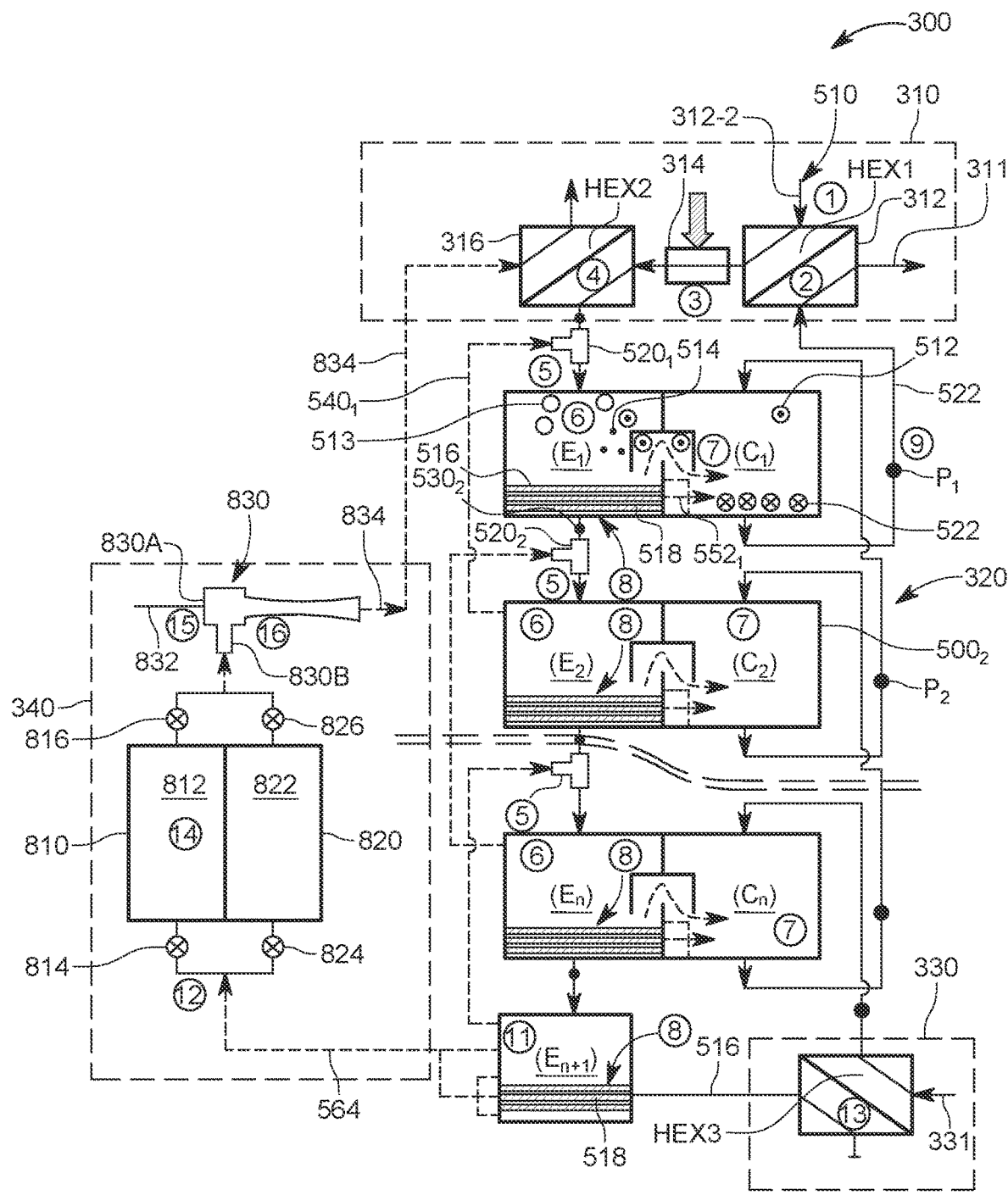
FIG. 9 illustrates the various steps taking place in the multi-stage, direct-contact, spray-assisted evaporation and condensation system.

An embodiment that describes how the DCSEC system 300 works when all the previous parts are connected together is illustrated in FIG. 9 and is now discussed. Intake seawater 510 is supplied at 1 to the first heat exchanger 312, at the input 312-2. Numerals 1 to 16 are used to show the points in the system where each action is taking place. After the seawater 510 is heated by the distillate 522, at 2, the heated seawater 510 is optionally provided to the heating element 314, at 3, for further heating. Then, at 4, the heated seawater 510 is further heated in the second heat exchanger 316, with the heat transferred from the hot vapor 834 received from the pressure-swing regeneration block 340.

The heated seawater 510 enters then at 5, into the first vortex generator $520_1$, where it receives vapor 512 from a next stage j=2. After forming the vapor bubbles 512 in the vortex generator, the bubbles and the seawater are injected into the evaporator $E_1$ of the first stage j=1, where the seawater bubbles 513 are generated, which promote the flash evaporation at 6. Note that no tubes are available inside the evaporator for helping the evaporation process, or inside the condenser for helping the condensation process. The vapors 512 evaporated from the bubbles 513 are driven due to the temperature difference between the evaporator $E_1$ and the condenser $C_1$, to the condenser $C_1$, at 7, and the vapors are then condensed in the condenser at 7, with help from the colder permeate 522 received from the next condenser j=2, as the permeate is injected into the current condenser j=1. Because both the evaporator and the condenser have no tubing, the flash evaporation at 6 and the condensation at 7 happens in open air. The seawater 514 that is not evaporated pools at the bottom of the evaporator as brine 516. The membrane module 518 is placed in the brine pool and further separates vapor $552_1$ from the brine 516, at 8. The vapor from the membrane module 518 is also directed to the condenser. The permeate 522 from the condenser is then pumped with a corresponding permeate pump $P_1$ to the first heat exchanger 312, at 9, or to a previous stage j−1 if the current stage is j.

Returning to the brine 516, it is pumped by a seawater pump $530_2$ at a next vortex generator $520_2$, at 5, and mixed up with the vapor from the next stage j=3, similar to the process at 5 described above with regard to the first stage j=1. In each further stage, the same processes 5, 6, 7, 8, and 9 take place as for the first stage, and thus, their description is omitted.

The brine from the stage n enters the last stage n+1, which has only the evaporator $E_{n+1}$ but no condenser. The brine 516 enters the evaporator $E_{n+1}$ at 11 and experiences flash evaporation, which generates the vapor 512. Part of the vapor 512 is reused by the vortex generator of the previous stage n, while the other part of the vapor is supplied to the pressure-swing regenerator block 340, at 12. The vapor generated by the membrane module 518 in the evaporator $E_{n+1}$ is also supplied to the regenerator block 340 at 12. The brine 516 in the last evaporator $E_{n+1}$ is supplied to the input/output block 330, for cooling the incoming cooling water 331 at 13. The cooled cooling water 331 is then provided to the last condenser $C_n$ to condense at 7 the vapors in the condenser.

The vapors 512 and $552_{n+1}$ from the last stage $E_{n+1}$ enter either the inlet valve 814 or the inlet valve 824, depending on which tank is open for receiving the vapor. Assuming that the tank 810 is open for receiving the vapors 512 and $552_{n+1}$, the vapors interact with the adsorbent material 812 at 14. When the adsorbent material in the tank is full with water, it needs to be regenerated. For this process to happen, the inlet valve 814 is closed and the outlet valve 816 is opened. The TVC 830 receives the high-pressure steam 832 at 15, creates a low pressure at the input 830B, which adsorbs the water from the adsorbent material 812 at 16. The vapor from the adsorbent material is mixed with the high pressure steam 832 to form the hot vapor 834, which is provided to the second heat exchanger 316 to heat the incoming seawater 510 at 4. The cooling water 331 mixed with the permeate 522 is finally provided to the first heat exchanger 312 to also heat the incoming seawater 510 at 2, and the mixture 311 of the cooling water 331 and the permeate 522 is expelled at output 312-4 of the first heat exchanger.

While the configuration of the system 300 shown in FIG. 3 and explained in FIG. 9 achieves one or more advantages as discussed herein, the system 300 could also work with no vortex generators, or less vortex generators than the number of stages. In one embodiment, the system 300 can also work with no pressure-swing regeneration block 340, in which case a corresponding condenser for the last evaporator $E_{n+1}$ can be added. In one embodiment, the system 300 can work with no vortex generator and no pressure-swing regeneration block.

Figure 10:
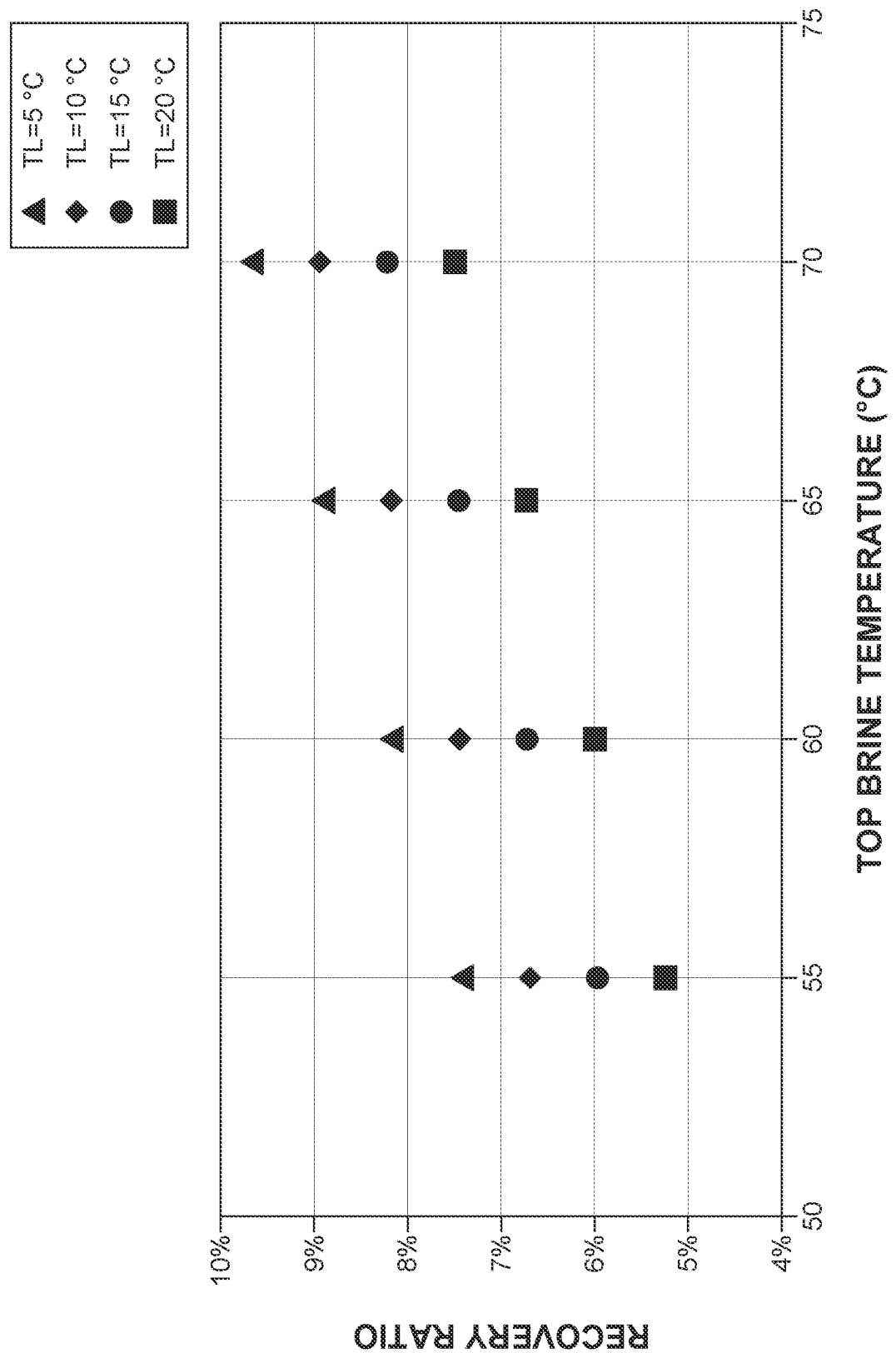
FIG. 10 shows the recovery ratio for different last stage temperatures of the multi-stage, direct-contact, spray-assisted evaporation and condensation system.
Figure 11:
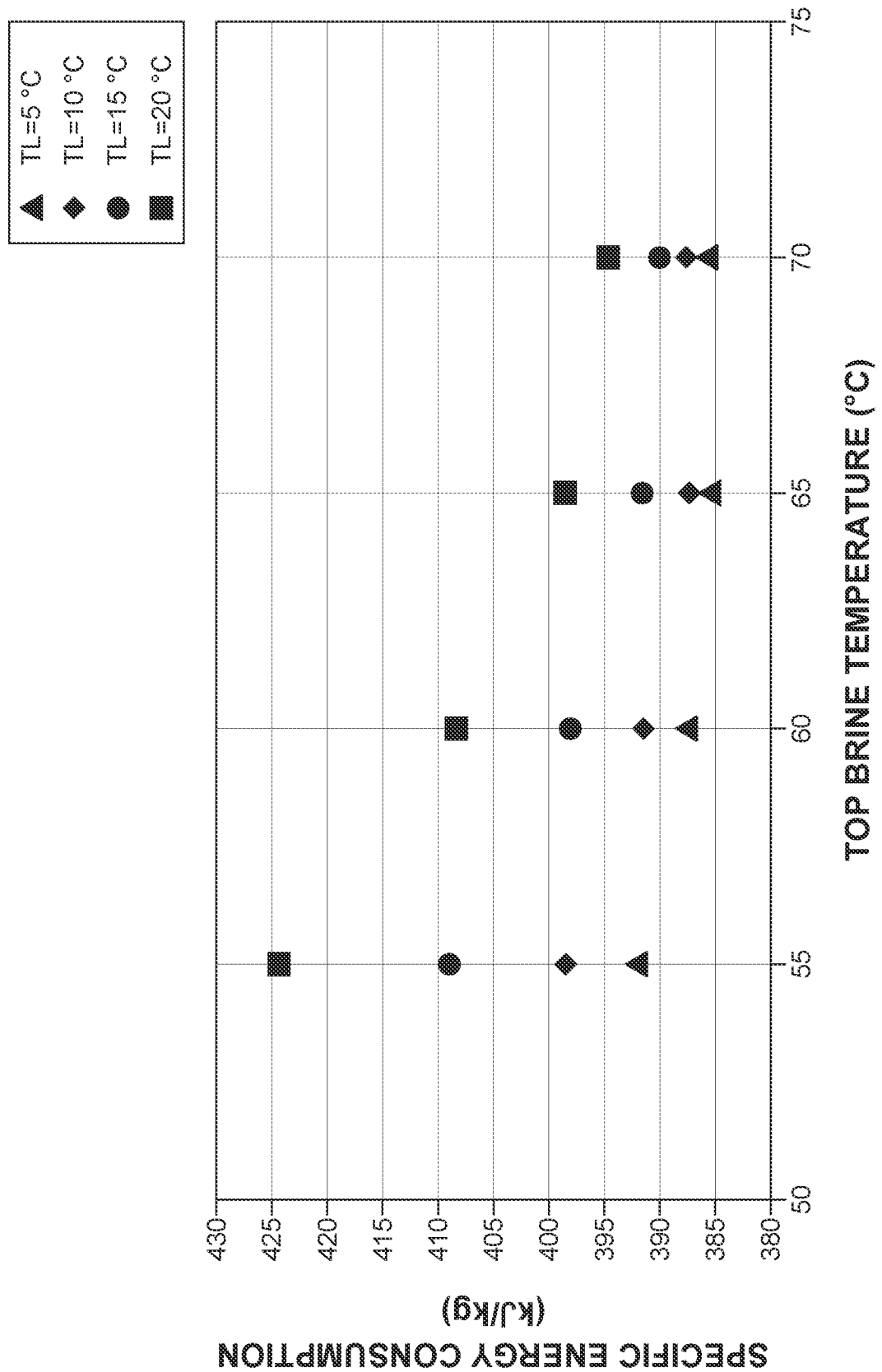
FIG. 11 shows the specific energy consumption for different last stage temperatures of the multi-stage, direct-contact, spray-assisted evaporation and condensation system.

The system 300 improves the productivity and energy efficiency of the thermal desalination processes. The application of the DCSEC technology eliminates the use of metallic surfaces (tubes) as the evaporators and condensers are tubeless, and reduce the initial cost of the system by 50%. The operation cost will also be decreased due to less maintenance requirements due to the lack of the tubes. The implementation of the micro- or nanobubble injection through the vortex generators and the use of the hollow-fiber membrane modules will reduce the NETD and promote evaporation, thus leading to a higher fresh water yield. The energy consumption will be reduced through (a) the stage-wise configuration discussed with regard to FIG. 9, which allows recovery of the condensation heat, (b) the integration of the adsorption-desorption process that reduces the cooling water temperature and provides more driving force for evaporation, and (c) the employment of the pressure-swing regeneration process (block 340) that allows the produced vapor to be used as the heating steam and further reduces heat input requirement. The proposed system is able to increase the seawater recovery ratio to more than 8%, and the energy consumption can be reduced to less than 30% of its original value. In this regard, FIG. 10 illustrates the simulated recovery ratio and FIG. 11 illustrates the simulated specific energy consumption of the system 300 for various temperatures at the last stage (TL). The proposed system 300 is not only energy efficient, but also cost-effective.

Figure 12:
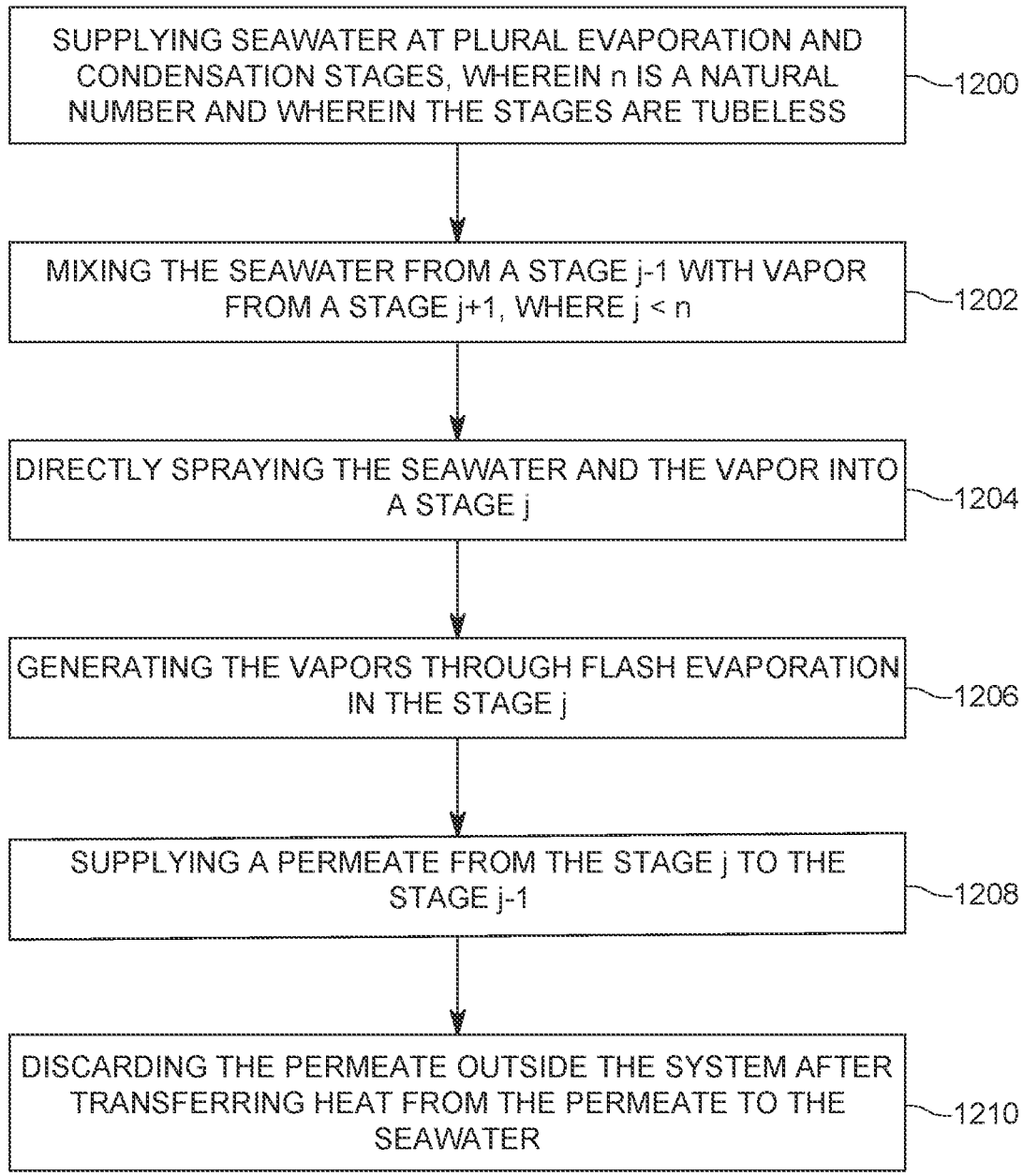
FIG. 12 is a flow chart of a method for water desalination using the multi-stage, direct-contact, spray-assisted evaporation and condensation system.

A method for water desalination with a direct-contact, spray-assisted, evaporation and condensation, DCSEC, system 300 is now discussed with regard to FIG. 12. The method includes a step 1200 of supplying seawater at plural evaporation and condensation stages $500_n$, wherein n is a natural number and wherein the stages are tubeless, a step 1202 of mixing the seawater from a stage j−1 with vapor from a stage j+1, where j<n, a step 1204 of directly spraying the seawater and the vapor into a stage j, a step 1206 of generating the vapors through flash evaporation in the stage j, a step 1208 of supplying a permeate from the stage j to the stage j−1, and a step 1210 of discarding the permeate outside the system after transferring heat from the permeate to the seawater.

This method, which may have additional steps as discussed with regard to the previous embodiments, may be implemented in a DCSEC system that includes the heating block 310, which is configured to receive and heat up seawater 510, plural evaporation and condensation stages $500_n$, wherein n is a natural number, each stage being configured to generate vapors 512 through flash evaporation; an evaporation only stage $500_{n+1}$ connected to a last stage of the plural evaporation and condensation stages $500_n$, the evaporation only stage $500_{n+1}$ configured to receive a brine 516 from the last stage of the plural evaporation and condensation stages $500_n$; an input/output block 330 configured to receive the brine 516 from the evaporation only stage $500_{n+1}$ and to discharge it outside the system, and also to receive cooling water 331; and a pressure-swing regeneration block 340 fluidly connected to the evaporation only stage $500_{n+1}$ to receive water vapor 512 and to generate a hotter vapor (834), which is provided to the heating block (310) for heating the seawater 510.

Alternatively, the method may be implemented in a DCSEC system that includes plural evaporation and condensation stages $500_n$, wherein n is a natural number, each stage being configured to generate vapors 512 through flash evaporation, from seawater 510, and a pressure-swing regeneration block 340 configured to receive water vapor 512 and to generate a hot vapor 834, which is used for heating the seawater 510. A stage j, with j<n, receives the seawater 510 from a stage j−1, and the seawater 510 is mixed with the vapor 512 from a stage j+1, and the stage j provides a permeate 522 to the stage j−1.

The disclosed embodiments provide a tubeless, multi-effect distillation system that uses direct contact spray and integrated pressure-swing adsorption cycle for water desalination. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

[1] Chen, Qian, and Kian J. Chua. "A spray assisted low-temperature desalination technology." Emerging Technologies for Sustainable Desalination Handbook. Butterworth-Heinemann, 2018. 255-284. https://doi.org/10.1016/B6978-0-12-815818-0.00008-4;

[2] O. Miyatake, T. Tomimura, Y. Ide, T. Fujii, An experimental study of spray flash evaporation, Desalination 36 (2) (1981) 113-128. https://doi.org/10.1016/S0011-9164(00)88635-X

[3] O. Miyatake, T. Tomimura, Y. Ide, M. Yuda, T. Fujii, Effect of liquid temperature on spray flash evaporation, Desalination 37 (3) (1981) 351-366. https://doi.org/10.1016/S0011-9164(00)88658-0

[4] Muthunayagam, A. E., K. Ramamurthi, and J. Robert Paden. "Modelling and experiments on vaporization of saline water at low temperatures and reduced pressures." Applied Thermal Engineering 25.5-6 (2005): 941-952. https://doi.org/10.1016/j.applthermaleng.2004.08.005

[5] Y. Ikegami, H. Sasaki, T. Gouda, H. Uehara, Experimental study on a spray flash desalination (influence of the direction of injection), Desalination 194 (1) (2006) 81-89. https://doi.org/10.1016/j.desal.2005.10.026

[6] Mutair, Sami, and Yasuyuki Ikegami. "Experimental investigation on the characteristics of flash evaporation from superheated water jets for desalination." Desalination 251.1-3 (2010): 103-111. https://doi.org/10.1016/j.desal.2009.09.136

[7] Mutair, Sami, and Yasuyuki Ikegami. "Experimental study on flash evaporation from superheated water jets: Influencing factors and formulation of correlation." International Journal of Heat and Mass Transfer 52.23-24 (2009): 5643-5651. https://doi.org/10.1016/j.ijheatmastransfer.2009.05.009

[8] El-Fiqi, Adel K., et al. "Flash evaporation in a superheated water liquid jet." Desalination 206.1-3 (2007): 311-321. https://doi.org/10.1016/j.desal.2006.05.017

[9] Chen, Q., et al. "Development of a model for spray evaporation based on droplet analysis." Desalination 399 (2016): 69-77. https://doi.org/10.1016/j.desal.2016.08.017

[10] Chen, Q., Y. Li, and K. J. Chua. "On the thermodynamic analysis of a novel low-grade heat driven desalination system." Energy conversion and management 128 (2016): 145-159. https://doi.org/10.1016/j.enconman.2016.09.070

[11] Wellmann, Johannes, et al. "Modeling an innovative low-temperature desalination system with integrated cogeneration in a concentrating solar power plant." Desalination and Water Treatment 55.12 (2015): 3163-3171. https://doi.org/10.1080/19443994.2014.940212

[12] Wellmann, Johannes, Bernhild Meyer-Kahlen, and Tatiana Morosuk. "Exergoeconomic evaluation of a CSP plant in combination with a desalination unit." Renewable Energy 128 (2018): 586-602. https://doi.org/10.1016/j.renene.2017.11.070

What is claimed is:

1. A direct-contact, spray-assisted, evaporation and condensation, DCSEC system comprising:
a heating block configured to receive and heat up seawater;

plural evaporation and condensation stages, each stage being configured to generate water vapors through flash evaporation;

an evaporation only stage connected to a last stage of the plural evaporation and condensation stages, the evaporation only stage configured to receive a brine from the last stage of the plural evaporation and condensation stages;

an input/output block configured to receive the brine from the evaporation only stage and to discharge the brine outside the system, and to receive cooling water; and a pressure-swing regeneration block fluidly connected to the evaporation only stage to receive water vapor from the evaporation only stage and to generate a hot vapor, which is provided to the heating block for heating the seawater, wherein a brine received by the last stage of the plural evaporation and condensation stages, from a previous stage of the plural evaporation and condensation stages, is mixed with water vapors from the evaporation only stage to generate bubbles, which are injected into an evaporator of the last stage of the plural evaporation and condensation stages.

2. The system of claim 1, wherein the plural evaporation and condensation stages include between 2 and 6 stages, and each stage includes a tubeless evaporator, which is devoid of internal heat exchanger tubes, and a tubeless condenser, which is devoid of internal heat exchanger tubes, and the tubeless evaporator and the tubeless condenser are connected to each other through a passage.

3. The system of claim 2, wherein the tubeless evaporator includes a membrane module that is configured to allow vapor from a corresponding brine to enter the membrane module and then to be discharged along another conduit into the tubeless condenser.

4. The system of claim 2, wherein each tubeless evaporator is fluidly connected to a corresponding vortex generator, which is configured to mix the seawater with the water vapors to create micro-sized or nano-sized bubbles.

5. The system of claim 2, wherein a condensate from a condenser in a stage of the plural evaporation and condensation stages is provided as cooling water to a condenser in a next stage of the plural evaporation and condensation stages.

6. The system of claim 5, wherein brine from an evaporator in a previous stage of the plural evaporation and condensation stages is mixed with water vapors from an evaporator in the next stage of the plural evaporation and condensation stages to generate bubbles that are injected into an evaporator of the stage of the plural evaporation and condensation stages, except for the first and last stage of the plural evaporation and condensation stages.

7. The system of claim 1, wherein each stage of the plural evaporation and condensation stages comprises:

a condensate pump that pumps a condensate from a condenser of the each stage of the plural evaporation and condensation stages to a condenser of a next stage of the plural evaporation and condensation stages.

8. The system of claim 7, wherein each stage of the plural evaporation and condensation stages further comprises:

a brine pump that pumps a corresponding brine from an evaporator of the each stage of the plural evaporation and condensation stages to an evaporator of the next stage of the plural evaporation and condensation stages.

9. The system of claim 1, wherein the heating block comprises:

a first heat exchanger;

a second heat exchanger; and a heating source.

10. The system of claim 9, wherein the first heat exchanger transfers heat from a condensate generated by the plural evaporation and condensation stages to the seawater, the heating source is a solar cell, and the second heat exchanger transfers heats from the hot vapor to the seawater.

11. The system of claim 1, wherein the pressure-swing regeneration block comprises:

a first tank configured to hold a first adsorbing material;

a second tank configured to hold a second adsorbing material; and a thermal vapor compressor.

12. The system of claim 11, wherein only one of the first and second tanks is in fluid communication with the thermal vapor compressor at a given time, and the thermal vapor compressor generates a low pressure to extract water vapor from the first or second tank, and to supply the hot vapor to the heating block.

13. A direct-contact, spray-assisted, evaporation and condensation, DCSEC, system comprising:

plural evaporation and condensation stages, each stage being configured to generate vapors through flash evaporation, from seawater; and a pressure-swing regeneration block configured to receive water vapor and to generate a hot vapor, which is used for heating the seawater, wherein a stage of the plural evaporation and condensation stages receives seawater from a previous stage of the plural evaporation and condensation stages, and the seawater from the previous stage of the plural evaporation and condensation stages is mixed with vapor from a next stage of the plural evaporation and condensation stages to generate bubbles, which are injected into an evaporator of the stage of the plural evaporation and condensation stages, and wherein the stage of the plural evaporation and condensation stages provides a condensate to the next stage of the plural evaporation and condensation stages.

14. The system of claim 13, further comprising:

an evaporation only stage connected to a last stage of the plural evaporation and condensation stages, the evaporation only stage configured to receive a brine from the last stage of the plural evaporation and condensation stages.

15. The system of claim 13, wherein the plural evaporation and condensation stages include between 2 and 6 stages, and each stage includes a tubeless evaporator, which is devoid of internal heat exchanger tubes, and a tubeless condenser, which is devoid of internal heat exchanger tubes, and the tubeless evaporator and the tubeless condenser are connected to each other through a passage.

16. The system of claim 15, wherein the tubeless evaporator includes a membrane module that is configured to allow vapor from a corresponding brine to enter the membrane module and then to be discharged along another conduit into the tubeless condenser.

17. The system of claim 15, wherein each tubeless evaporator is fluidly connected to a corresponding vortex generator, which is configured to mix the seawater with water vapors to create micro-sized or nano-sized bubbles.

18. The system of claim 13, wherein each stage of the plural evaporation and condensation stages comprises:

a condensate pump that pumps the condensate from a condenser of a stage of the plural evaporation and condensation stages to a condenser of a previous stage of the plural evaporation and condensation stages; and a brine pump that pumps a brine from an evaporator of the previous stage of the plural evaporation and condensation stages to an evaporator of the stage of the plural evaporation and condensation stages.

19. The system of claim 13, wherein the pressure-swing regeneration block comprises:
  a first tank configured to hold a first adsorbing material;
  a second tank configured to hold a second adsorbing material; and
  a thermal vapor compressor,
  wherein only one of the first and second tank is in fluid communication with the thermal vapor compressor at a given time, and the thermal vapor compressor generates a low pressure to extract water vapor from the first or second tank, and to supply the hot vapor to a heating block that receives the seawater.

20. A method for water desalination with a direct-contact, spray-assisted, evaporation and condensation, DCSEC, system, the method comprising:
  supplying seawater at plural evaporation and condensation stages, wherein a stage of the plural evaporation and condensation stages includes a tubeless evaporator, which is devoid of internal heat exchanger tubes, and a tubeless condenser, which is devoid of internal heat exchanger tubes, and the tubeless evaporator and the tubeless condenser are connected to each other through a passage;
  mixing seawater from a previous stage of the plural evaporation and condensation stages with vapor from a next stage of the plural evaporation and condensation stages to generate bubbles;
  directly spraying the bubbles into the stage of the plural evaporation and condensation stages;
  generating the vapors through flash evaporation in the stage of the plural evaporation and condensation stages;
  supplying a condensate from the stage of the plural evaporation and condensation stages to the previous stage of the plural evaporation and condensation stages; and
  discarding the condensate outside the system after transferring heat from the condensate to the seawater.

* * * * *